3,109,708
MANUFACTURE OF TITANIUM DIOXIDE
Anthony Walmsley, Roundhay, Leeds, England, assignor to Laporte Titanium Limited, London, England, a company of Great Britain
No Drawing. Filed Nov. 4, 1959, Ser. No. 850,759
6 Claims. (Cl. 23—202)

This invention relates to the manufacture of titanium dioxide by reacting a titanium tetrahalide vapour with an oxidising gas.

It has previously been proposed to carry out this reaction in the vapour phase in the presence of a fluidised bed of particles maintained at a temperature of at least 800° C. The reaction is exothermic and, when it is carried out in a sufficiently large and well thermally insulated reactor, the heat evolved is sufficient to maintain the reactants at the desired temperature. If a small or less well insulated reactor is used, however, it is necessary to supply heat, and it has been proposed to do this by burning carbon monoxide within the reactor.

It has now been found that, when carbon monoxide is burned within the reactor and the fluidised bed comprises particles of which at least a part of the surface is composed of titanium dioxide, there is a tendency for the reactor to become blocked.

This invention provides a process for the manufacture of titanium dioxide by the oxidation of a titanium tetrahalide in the vapour phase by causing an oxidising gas to react with the titanium tetrahalide in the presence of a fluidised bed comprising particles of which at least a part of the surface is composed of titanium dioxide and which are at a temperature within the range of from 800 to 1,500° C., wherein carbon monoxide is introduced into the fluidised bed and there is incorporated with the carbon monoxide a diluent gas being one, or a mixture of more than one, of nitrogen, chlorine and carbon dioxide, and the quantities of carbon monoxide and diluent gas being such that the proportion of diluent gas by volume and based on the total volume of carbon monoxide and diluent gas lies within the range of from 11 to 65%.

The term "titanium tetrahalide" is used herein to denote the tetrachloride, tetrabromide and tetraiodide, and excludes the tetrafluoride.

It has been found that the incorporation of the diluent gas with the carbon monoxide introduced into the fluidised bed substantially prevents or greatly lessens the tendency for the reactor to become blocked. Although the melting point of titanium dioxide is about 1,820° C., it has been found that blocking of the reactor can occur when the temperature of the bed, as indicated by a thermocouple situated within the bed, is within the range of from 900 to 1,050° C. It is believed that the blocking is caused by the partial fusion and resultant cohesion of titanium dioxide particles in a region close to the point of entry of the carbon monoxide into the reactor. The beneficial effect of the diluent gas is probably due to the fact that it lowers the temperature in that region and so prevents or lessens the fusion of titanium dioxide within the reactor.

The oxidising gas may be a gaseous oxygen compound, for example, an oxide of nitrogen. Advantageously, the oxidising gas is oxygen.

Of the titanium dioxide produced, part is carried away with the gases leaving the reactor and part remains in the bed, the latter part being substantially entirely in the form of a deposit on the particles forming the bed. Thus, although the incorporation of the diluent gas is especially useful when the fluidised bed is made up of particles of which at least a major proportion consist substantially of titanium dioxide, it is also important when the fluidised bed is made up of particles of which at least a major proportion consist of a refractory oxide other than titanium dioxide together with a deposit of titanium dioxide produced by the oxidation.

The deposition of titanium dioxide on the particles forming the bed causes the mean size of the particles to increase and, advantageously, the size distribution of the particles is controlled in the manner described in British patent specification No. 3330/58, that is to say, by gradually adding to the bed from an outside source fluidisable particles of alumina, silica, zirconia, zircon or titanium dioxide, or a mixture of some or all of such particles, and gradually withdrawing particles from the bed, the mean size of the added particles being smaller than the mean size of the particles withdrawn.

The temperature of the bed, as measured by a thermocouple situated within the bed at a point remote from any gas inlet, may be within the range of from 850 to 1,300° C. and is advantageously within the range of from 950 to 1,250° C.

The said proportion of diluent gas may be within the range of from 15 to 40% and is advantageously within the range of from 20 to 30%.

When the titanium tetrahalide is titanium tetrachloride, the diluent gas may comprise chlorine produced by the oxidation reaction.

If desired, in addition to the diluent gas incorporated with the carbon monoxide, a diluent gas may, as is known, be incorporated with the titanium vapour and/or the oxidising gas, for example when the oxidising gas is oxygen, it may be introduced in the form of air. No oxidising gas should be incorporated with the carbon monoxide fed to the reactor because the presence of such a gas in the gas stream containing the carbon monoxide might give rise to a risk of an explosion.

The following examples illustrate the invention:

*Example 1*

The reaction was carried out in a cylindrical reactor mounted with its axis vertical and having an internal diameter of 8 inches. 30 pounds of titanium dioxide particles having sizes within the range −60 +85 BSS mesh was introduced into the reactor and formed a bed in the lower part of it. The reactor and the bed were heated to the desired operating temperature (which was measured by means of a thermocouple situated centrally within the bed) by burning a fuel gas within the reactor, and the following gas streams were introduced into the bed through separate gas inlets:

(1) Titanium tetrachloride vapour in admixture with nitrogen;
(2) Oxygen; and
(3) Carbon monoxide in admixture with nitrogen.

In order to prevent the deposition of titanium dioxide on the particles of the bed from resulting in a continual increase in the average size of the bed, the size distribution of the particles forming the bed was controlled in the way described in the example set out in the provisional specification accompanying our co-pending application No. 3330/58.

After a time, the reaction was stopped and the interior of the reactor was examined.

The rates of introduction of the various gases, the temperature of the bed, the period of operation, and the condition of the interior of the reactor at the end of the reaction are set out in the accompanying table.

In order to provide a basis for comparison, the reaction was then repeated without the introduction of nitrogen in admixture with the carbon monoxide. The conditions and the result of this first comparison experiments are set out in the table. It will be seen that, whereas in Example 1, after a period of 24 hours, the gas inlet ports remained clear and the bed remained free with no signs that fusion of titanium dioxide had occurred.

in the first comparison experiment, after a period of only 2½ hours, the inlets for the gas streams (1) and (3) were found to be blocked and it was found that some of the titanium dioxide in the bed had fused.

*Example 2*

The reaction was carried out in the same way as in Example 1 except that the gas flow rates, temperature of the bed and period of operation were different, being as set out in the table.

In order to provide a basis for comparison with Example 2, a second comparison experiment was carried out in which the reaction was repeated without the introduction of nitrogen in admixture with the carbon monoxide. The conditions and results of this experiment are set out in the table, and it will be seen that, whereas in Example 2, after a period of 8½ hours, the gas inlet comparison experiment, fusion and consequent blockports remained clear and the bed was free, in the second ing occurred in the bed after a period of only 2 hours. Also, in the second comparison experiment, the temperature of the bed, as indicated by the centrally located thermocouple, was less than the desired temperature and it was not found possible to increase it.

2. A process as claimed in claim 1, wherein the said diluent gas is incorporated with the carbon monoxide prior to the introduction of the carbon monoxide into the fluidised bed.

3. A process as claimed in claim 1, wherein the oxidising gas is oxygen and the said proportion of diluent gas is within the range of from 15% to 40%.

4. A process as claimed in claim 1, wherein the titanium tetrahalide is titanium tetrachloride and the diluent gas comprises chlorine produced by the oxidation reaction.

5. A process as claimed in claim 1, wherein the oxidising gas is oxygen and the temperature of the bed as measured by a thermocouple situated within the bed at a point remote from any gas inlet is within the range of from 850° C. to 1,300° C.

6. A process for the manufacture of titanium dioxide by the oxidation of a titanium tetrahalide in the vapour phase by causing an oxidising gas to react with the titanium tetrahalide in the presence of a fluidised bed comprising particles of which at least a part of the surface is composed of titanium dioxide and which are at a temperature within the range of from 800° C. to 1,500° C., wherein the titanium tetrahalide and carbon monoxide

| Experiment | $TiCl_4$ stream | | Oxygen stream, lbs./hr. $O_2$ | Carbon monoxide stream | | Proportion of diluent gas as percent of CO+diluent gas | Bed temperature, °C. | Operating period | State of reactor and bed at end of operating period |
|---|---|---|---|---|---|---|---|---|---|
| | lbs./hr. $TiCl_4$ | lbs./hr. $N_2$ | | lbs./hr. CO | lbs./hr. $N_2$ (diluent) | | | | |
| Example 1 | 100 | 3.14 | 30.5 | 11.7 | 3.14 | 21.2 | 1,200–1,250 | 24 | Bed free and gas inlets clear. |
| First comparison experiment. | 100 | 3.61 | 31.9 | 5.86 | nil | 0 | 950–1,050 | 2½ | $TiCl_4$ and CO inlets blocked and fusion of $TiO_2$ in bed. |
| Example 2 | 75 | 2.28 | 31 | 9.35 to 12.3 | 3.45 | 21.9 to 27.0 | 1,010–1,170 | 8½ | Bed free and gas inlets clear. |
| Second comparison experiment. | 75 | 7.21 | 32 | 10.9 | nil | 0 | 970–1,100 | 2 | Bed blocked as a result of fusion of $TiO_2$. |

I claim:

1. A process for the manufacture of titanium dioxide by the oxidation of a titanium tetrahalide in the vapour phase by causing an oxidising gas to react with the titanium tetrahalide in the presence of a fluidised bed comprising particles of which at least a part of the surface is composed of titanium dioxide and which are at a temperature within the range of from 800° C. to 1,500° C., wherein the titanium tetrahalide and carbon monoxide are introduced separately into the fluidised bed, oxidising gas is introduced into the fluidised bed separately from the carbon monoxide and in a quantity sufficient to react with the whole of both the titanium tetrahalide and the carbon monoxide, the concentration of carbon monoxide in the region of introduction of the carbon monoxide into the fluidised bed is reduced by incorporating with the carbon monoxide a diluent gas selected from the group consisting of nitrogen, chlorine, carbon dioxide and a mixture of more than one of these gases, and the quantities of carbon monoxide and the said diluent gas are such that the proportion of diluent gas by volume and based on the total volume of carbon monoxide and the said diluent gas lies within the range of from 11% to 65%.

are introduced separately into the fluidised bed, oxidising gas is introduced into the fluidised bed separately from the carbon monoxide and in a quantity sufficient to react with the whole of both the titanium tetrahalide and the carbon monoxide, the concentration of carbon monoxide in the region of introduction of the carbon monoxide into the fluidised bed is reduced by incorporating with the carbon monoxide a diluent gas selected from the group consisting of nitrogen, chlorine, carbon dioxide and a mixture of more than one of these gases, and introduced into the fluidised bed separately from the oxidising gas, and the quantities of carbon monoxide and the said diluent gas are such that the proportion of diluent gas by volume and based on the total volume of carbon monoxide and the said diluent gas lies within the range of from 11% to 65%.

References Cited in the file of this patent

UNITED STATES PATENTS

| 2,670,275 | Olson et al. | Feb. 23, 1954 |
| 2,750,260 | Nelson et al. | June 12, 1956 |
| 2,760,846 | Richmond et al. | Aug. 28, 1956 |
| 2,964,386 | Evans et al. | Dec. 13, 1960 |